US011865066B2

(12) United States Patent
Luong et al.

(10) Patent No.: US 11,865,066 B2
(45) Date of Patent: Jan. 9, 2024

(54) PEDICURE CHAIR WITH AUTO-FILL SYSTEM FOR A WATER BASIN AND RELATED METHODS

(71) Applicant: Lexor, Inc., Westminster, CA (US)

(72) Inventors: Christopher L. Luong, Westminster, CA (US); Quang Nguyen, Irvine, CA (US); Long Luong, Irvine, CA (US)

(73) Assignee: CL CAPITAL INVESTMENTS GROUP LLC, Westminster, CA (US)

( * ) Notice: Subject to any disclaimer, the term of this patent is extended or adjusted under 35 U.S.C. 154(b) by 697 days.

(21) Appl. No.: 16/863,058

(22) Filed: Apr. 30, 2020

(65) Prior Publication Data

US 2020/0345579 A1 Nov. 5, 2020

Related U.S. Application Data

(60) Provisional application No. 62/841,029, filed on Apr. 30, 2019.

(51) Int. Cl.

| | |
|---|---|
| ***A61H 33/00*** | (2006.01) |
| ***A61H 35/00*** | (2006.01) |
| ***A47C 1/11*** | (2006.01) |
| ***A47C 7/74*** | (2006.01) |
| ***A45D 29/00*** | (2006.01) |
| ***A47C 7/72*** | (2006.01) |

(52) U.S. Cl.

CPC ........... *A61H 33/601* (2013.01); *A45D 29/00* (2013.01); *A47C 1/11* (2013.01); *A47C 7/725* (2013.01); *A47C 7/748* (2013.01); *A61H 33/0087* (2013.01); *A61H 35/006* (2013.01); *A61H 2201/0149* (2013.01); *A61H 2203/0431* (2013.01)

(58) Field of Classification Search

CPC ............ A47K 3/022; A61H 2033/0054; A61H 33/0087; A61H 35/006; E03C 1/055–057; E03C 1/242; E03C 1/22

See application file for complete search history.

(56) References Cited

U.S. PATENT DOCUMENTS

| | | | | |
|---|---|---|---|---|
| 4,716,605 A * | 1/1988 | Shepherd | A61H 33/60 | 4/541.3 |
| 6,732,387 B1 * | 5/2004 | Waldron | A61H 35/006 | 4/541.2 |
| 7,451,502 B2 * | 11/2008 | Ball | E03C 1/23 | 4/689 |

(Continued)

FOREIGN PATENT DOCUMENTS

| | | | |
|---|---|---|---|
| KR | 200353348 | * 6/2004 | A61H 23/04 |
| KR | 20060106533 | * 10/2006 | A47K 3/022 |

*Primary Examiner* — David P Angwin
*Assistant Examiner* — Nicholas A Ros
(74) *Attorney, Agent, or Firm* — KOS IP Law LLP

(57) ABSTRACT

A pedicure chair with a basin having an auto-fill system for depositing water into the basin while eliminating spillover is disclosed. The auto-fill system has a controller, a water supply valve, and a water level sensor. The water level sensor can be a proximity sensor attached to an external surface of the basin. The water level sensor can send a signal to a controller when the water level sensor detects a predetermined water level in the basin. The controller can be configured to shut on and off the water supply to the basin by sending a signal to actuate the water supply valve.

21 Claims, 9 Drawing Sheets

(56) References Cited

U.S. PATENT DOCUMENTS

| | | | | |
|---|---|---|---|---|
| 8,296,874 | B2 * | 10/2012 | Galati, Jr. | A47K 3/022 601/158 |
| 2004/0154094 | A1 * | 8/2004 | Ostrowski | E03B 7/04 4/541.1 |
| 2004/0261173 | A1 * | 12/2004 | Chen | A61H 35/006 4/622 |
| 2007/0186342 | A1 * | 8/2007 | Condon | A61H 35/006 4/622 |
| 2011/0004994 | A1 * | 1/2011 | Le | A61H 35/006 4/541.1 |
| 2017/0350107 | A1 * | 12/2017 | Braddock | E03C 1/242 |

* cited by examiner

PEDICURE CHAIR WITH AUTO-FILL SYSTEM FOR A WATER BASIN AND RELATED METHODS

PRIORITY STATEMENT

This application claims the benefit of priority to U.S. Patent Provisional Application No. 62/841,029, filed Apr. 30, 2019, the entire contents of which are hereby incorporated herein by reference.

FIELD OF ART

The present disclosure is directed to apparatuses and methods for a pedicure chair with a basin and more particularly to controls and mechanisms for filling water into the basin of the pedicure chair and related methods.

BACKGROUND

Some pedicure chairs have a pipe system to introduce water into, and remove water from, the chair's basin. Between usage by different customers, the water of the basin can be replaced to maintain hygiene. To help facilitate cleanliness and ease of use, replaceable liners can be used with the basin. The liner can cover the interior of the basin and contain the water so that water directly contacts the liner instead of the basin. In this way the user can have a basin bath that is ostensibly more sanitary. To provide auto-filling of the basin with water and not require attendance by a worker or a technician, an electro-mechanical sensor can be used to sense the level of water. The electro-mechanical sensor can have two prongs sticking outward, or into the basin, to sense the water level through contact. In order to maintain the operability of the electro-mechanical sensor, the liner must be hooked under the electro-mechanical sensor in order to allow the prongs to be able to contact the water.

SUMMARY

Aspects of the invention include a pedicure chair assembly with an auto-fill system, comprising: a seat having a seating surface; a basin located, elevation-wise, below the seat, said basin having wall having an exterior surface, an interior surface defining a basin interior, a basin sidewall and a basin bottom wall; an electronically controllable valve configured to control flow of water into the basin; a level sensor mounted wholly externally of the basin interior and configured to detect a first predetermined water level; and a controller programmed to receive a level indication signal from the sensor corresponding to the first predetermined water level and send a command signal to electronically controllable valve to open the valve for fluid flow through the valve or to close the valve to block fluid flow through the valve.

The level sensor can be a capacitive proximity sensor.

More than one sensor could be used. For example, a first level sensor and a second level sensor could be mounted wholly externally of the basin interior and configured to detect a second predetermined water level.

The second sensor can be attached nearer a top of the basin than the first sensor; wherein the second predetermined water level can correspond to a higher water level than the first predetermined water level; and wherein the controller can be configured to receive a second signal from the second sensor corresponding to the second predetermined water level.

The controller can be configured to activate a basin electronic component after shutting off the flow of water into the basin.

The basin electronic component can comprise at least one of a water jet, a heating element, a steamer, a light, or a water circulation pump.

The electronically controllable valve can be a solenoid valve.

The controller can be programmed to compare the first signal from the first sensor to a prestored value for determination of the first predetermined water level.

The basin can be made from a resin material.

The basin can be transparent or semi-opaque so that lights mounted inside the chair body can shine through the wall of the basin.

Aspects of the invention could further include a method of using a pedicure chair assembly, comprising: electronically wiring electronically controllable valve to a controller, the electronically controllable valve controllable by the controller to control flow of water into the basin, the basin located, elevation-wise, below a seat and the basin having wall having an exterior surface, an interior surface defining a basin interior, a basin sidewall and a basin bottom wall; attaching a level sensor wholly externally of the basin interior to detect a first predetermined water level inside the basin interior; and electronically connecting the level sensor to the controller, the controller being configured to receive a first signal from the level sensor corresponding to the first predetermined water level and send a command signal to the electronically controllable valve to actuate the valve.

The method can include programming the controller to send the command signal to close the valve to shut off the flow of water into the basin in response to receiving a first signal from a first sensor corresponding to a first predetermined water level.

The method can include utilizing a second sensor attached to the first wall exterior and configured to detect a second predetermined water level.

The method can include attaching the second sensor nearer a top of the basin than the first sensor; wherein the second predetermined water level corresponding to a higher water level than the first predetermined water level; and wherein the controller can be configured to receive a second signal from the second sensor corresponding to the second predetermined water level and send a failsafe signal to actuate the valve as a failsafe even if the first signal is not received from the first sensor.

The method can including configuring the controller to activate a basin electronic component after shutting off the flow of water into the basin.

The method can including using the controller to compare the first signal from the first sensor to a prestored value for determination of the first predetermined water level.

BRIEF DESCRIPTION OF THE DRAWINGS

These and other features and advantages of the present devices, systems, and methods will become appreciated as the same become better understood with reference to the specification, claims and appended drawings wherein:

DETAILED DESCRIPTION

The detailed description set forth below in connection with the appended drawings is intended as a description of the presently preferred embodiments of pedicure chair with basin provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
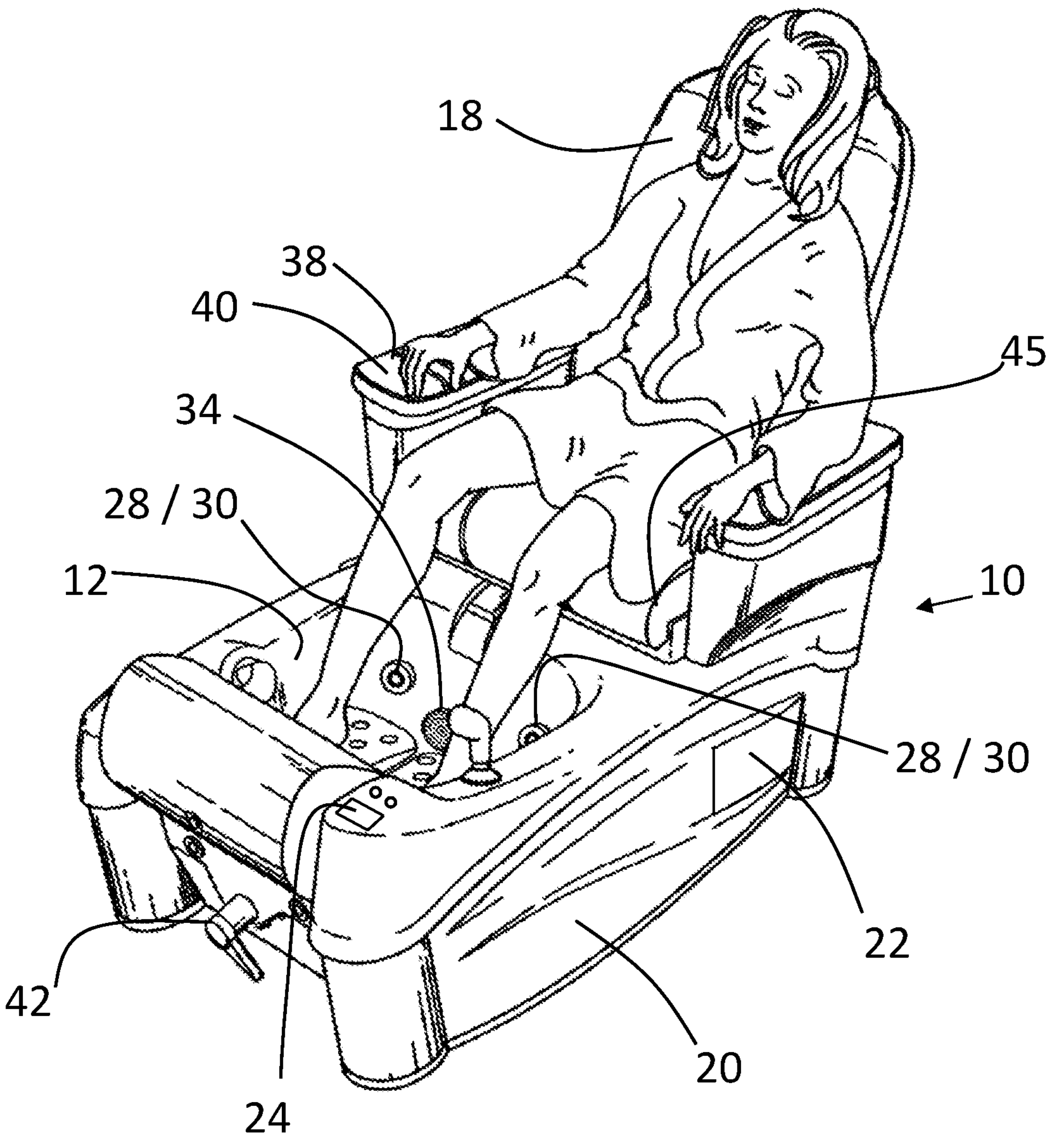
FIG. 1 illustrates a perspective view of a pedicure chair assembly with a basin and control panels for controlling various functions associated with the chair.

Referring now to FIG. 1, a pedicure chair 10 comprises a basin 12 for holding a water bath with a user seated on a seat 45 supported by a seat back 18. The open end of the basin 12 is located below, elevation-wise, the seat 45 of the pedicure chair 10 upon which the user sits. The basin 12 is sized and shaped to receive the person's feet and submerge at least a portion of the person's feet in water. While pedicure chair 10 has a basin 12 that is unitarily formed with the chair cover or body 20, in other embodiments the chair cover or body 20 could be provided having an opening to receive a separately formed basin 12, which could be made from a different material than the material of the chair body 20. Such a basin could be placed within a basin opening of the chair cover or body, similar to an opening of a countertop for a sink. The basin could be made of any suitable material, such as thermoplastic, a resin material, or glass, and could be made to be transparent, translucent, or could be opaque.

The basin 12 could be filled with water via any suitable manner, for example the a water supply outlet 318 of FIG. 1A, as further discussed below. Water can be circulated in the basin 12 by one or more circulating pumps 28 having a motor housing located behind the surface of chair cover or chair body 20 and a pump end having an impeller and a cap or cover with nozzles 30, such as inlets and outlets, that could be adjustable to direct the flow of water, such as to flow at or towards the person's feet. The pump with the cover may be referred to as a jet. While two covers 30 are visible in FIG. 1 there may be fewer or more covers in alternative embodiments, such as only one pump 28, or three or four.

In some examples, each circulating pump 28 can have its pump cavity, including the pump cover and the pump impeller, located inside the interior of the basin 12, and inside the reservoir space defined by a liner, if any, and magnetically coupled to a drive end located externally of the interior of the basin. The magnetic rotor of the drive end can rotate and can cause the impeller to rotate via a magnetic drive, without direct connection via a drive shaft. The drive end, can be located inside the chair cover 20. The impeller on the inside of the basin can be rotated magnetically from a magnetic drive motor located externally of the basin. In other examples, the impeller is directly driven by a drive shaft. In some examples, one or more removable panels 22 are provided with the chair housing to provide access to the one or more circulating pumps 28 disposed under the seat 45, such as for maintenance and repairs. An induction heating system 34 can be incorporated with the pedicure chair 10 to allow water in the basin to be warmed.

As shown, the pedicure chair assembly 10 includes a control panel 38 and a display 40 for controlling various functions of the pedicure chair assembly 10, such as to control functions of a controller to then instruct an auto-fill system to fill the basin, turn on lighting, turn on the heater or steam, etc. Other switches or control mechanisms may be included, such as an on/off button and switches for controlling other functions incorporated with the chair, such as to controlling moving massage elements or turning on music.

The display 40 may be selectable to display various parameters such as actual water temperature, desired water temperature, elapsed time that the person has immersed their feet in the basin 12, total time, or other parameters. In another example, a second control and display panel 24 is provided nearer the basin 12 and further away from the user or customer of the pedicure chair to permit the technician or worker to control the water temperature and other parameters. The second control and display panel 24 may include a different toggle switches or dial knobs, an on/off switch, and an emergency override, as non-limiting examples.

To provide auto-filling of a basin of a pedicure chair with water, an electro-mechanical sensor can be used to sense the level of water. The electro-mechanical sensor can have two prongs sticking outward, or into the basin, to sense the water level through contact. In order to maintain the operability of the electro-mechanical sensor, a basin liner must be hooked under the electro-mechanical sensor in order to allow the prongs to be able to contact the water. Whether the level sensor is of a two-prong type or other types, such as a magnetic switch type, or a ball float type, direct contact between the water and a component of the level gauge is required.

In order to maintain the operability of the electro-mechanical sensor, the liner must be hooked under the electro-mechanical sensor in order to allow the prongs, or other components of the level gauge, to be able to contact the water. This requires proper training by an operator and time spent by the operator in order to position the liner under the electro-mechanical sensor and to correctly attach the electro-mechanical sensor following each change-out.

One way to reduce the necessary training and time is to use a level gauge with a sensor that does not require direct contact between the water and a component of the level gauge. The present disclosure provides embodiments that may simplify the set up and training required for using a liner with a basin for a pedicure chair. Embodiments of the present disclosure includes an optical sensor that may aid in preventing overflow due to incorrect installation of a liner in such a manner that an electro-mechanical sensor would be prevented from sensing the water level. Additionally, the usage of an optical sensor in combination with the basin can reduce or eliminate leaks and lower maintenance requirements. One way to reduce the likelihood of leaks is to maintain the integrity of the basin structure that holds the water by reducing the number of components that project through the walls of the basin. Preferably, the water level sensor is mounted on an exterior of the basin and does not require physical penetration through the wall of the basin. In this way, the structural integrity of the basin can be maintained.

An aspect of the invention includes auto-fill systems for pedicure chairs with basins or auto-fill systems for basins for use with pedicure chairs. Referring now to FIG. 1A, an auto-fill system 100 for use with a basin 102 and a disposable liner 104 is shown. The basin 102 may be usable with the pedicure chair shown in FIG. 1. The liner can include a draw string or an elastic band for wrapping around the upper opening of the basin. The auto-fill system 100 can generally be understood as comprising components from a controller 200 having a control board, a water supply assembly 300, a drain assembly 400, and a water level sensor 402.

The basin 102 can be separate or integral with a pedicure chair as generally understood by one of ordinary skill in the art. An exemplary integrated basin with pedicure chair is disclosed in Reissue U.S. Pat. No. Re46,655, the contents of which are expressly incorporated herein by reference. The basin 102 can have a bowl shape with an interior surface 102*a* and an exterior surface 102*b*. The interior surface 102*a* and the exterior surface 102*b* can both have a bottom portion and a sidewall portion to form the bowl shape. These sections may be referred to as interior and exterior bottoms and interior and exterior sidewall portions. The basin 102 can be sized and shaped to hold a volume of water and accommodate a customer's feet. The basin 102 can be supplied with water for filling from the water supply assembly 300. The water supply assembly 300 and its water supply are described further below.

The basin can have an opening 103 at a bottom portion for draining of the water from the basin, similar to a bathroom sink. The opening 103 can connect to a drain assembly 400 to drain water from the basin. The drain assembly 400 can include a basin drain mechanism 410 that is movable between a first position to prevent draining from the basin and a second position that allows for draining from the basin. The basin drain mechanism 410 can be actuated by a drain actuator 412, such as an electromagnet or solenoid. The drain actuator 412 can be controlled by the controller 200. The drain assembly 400 can include a drain conduit or pipe 414 to drain the water from the basin 102. The drain conduit 414 can be connected to an exterior drain connection or line. The drain conduit can extend obliquely to the side of the drain basin for easy connection and can include other pipe fittings, such as elbows, tees, flex coupling, etc. to facilitate connection. Alternatively, the drain assembly 400 can have a direct connection to an exterior drain connection under the opening 103, without a drain conduit extending obliquely.

In an exemplary embodiment, the drain assembly 400 can include a drain sensor 404 for detecting the presence of water in the basin 102. The drain sensor 404 can be connected, such as wired, to the controller 200 to provide a signal corresponding to the detection of water in the basin 102. In an exemplary embodiment, the drain sensor 404 can be a proximity sensor mountable on the exterior surface 102*b* of the basin 102. Such a proximity sensor can be, for example, one of a capacitive proximity sensor, also called capacitance proximity sensor, or a photoelectric sensor, such as a diffused photoelectric sensor in which the receiver and emitter are located in the same housing or a through beam type in which the receiver and emitter are located separately. In embodiments, the drain sensor 404 can be preferably mounted on a bottom portion of exterior surface 102*b* of the basin 102.

Alternative types of sensors can be used as the drain sensor 404, including types of sensors that need to extend into the basin 102 or be mounted on the interior surface 102*a* of the basin. A proximity type drain sensor can be used on the exterior surface to avoid drilling additional holes in the basin, thereby preserving the structural integrity of the basin. Use of the proximity type drain sensor allows for detection without regards to the disposable liner 104 located around the drain sensor 404 as if it was mounted on the interior surface 102*a* of the basin. The drain sensor 404 can be utilized to determine whether water is present in the basin 102. The drain sensor can send a first signal to the controller 200 when no water is present and a second signal when water is present. In an example, the drain tubing or pipe can be made from plastic and a capacitive proximity sensor is used to detect water flow through the drain tubing or pipe.

Regarding the water supply assembly 300 for filling the basin, a water supply outlet 318 can be provided to supply water to the basin 102 from a cold water source and a hot water source. A cold water valve 302 can control the flow of cold water from a cold water source. A hot water valve 304 can control the flow of hot water from a hot water source. In an exemplary embodiment, the cold water and hot water valves 302, 304 can be solenoid valves. In an exemplary embodiment, both the cold water valve 302 and the hot water valve 304 are solenoid valves, such as 2-way or 2-port solenoid valves. The cold water valve 302 and the hot water valve 304 can be controlled by the controller 200 to allow flow through the valves 302, 304. For example, a switch can be provided to signal the controller to activate the two valves 302, 304 to permit flow.

The controller 200 can then send a signal to each of the cold water valve 302 and the hot water valve 304 to stop the flow of water from the cold water source and hot water source when a water height or level is detected in the basin, as detected by a water level sensor as further discussed below. The cold water valve 302 can be a different type of valve from the hot water valve 304 or the two valves can be of the same type. In some examples, one or both valves can be a proportioning-type solenoid valve that opens and closes to provide flow rates that are proportional to the input voltage. In other examples, the solenoid valves are simply on/off type valves or fully opened/fully closed valves.

Alternative types of flow control devices can be used for the valves 302, 304. Alternative flow control devices can include ball valves or butterfly valves that are motor driven or actuated. The controller 200 can send a signal to activate the motor to actuate the valve. The signal can be an activation signal, such as by way of a field effect transistor (FET), to provide power to the motor, or the signal can be a drive signal to power the motor. In embodiments, a digital encoder or potentiometer can be coupled to each valve to provide feedback on a position of each of the valves to the controller 200.

A water mixer 314 can mix the cold water and the hot water to supply mixed water to the water supply outlet. For example, the water mixer 314 can be an inline static mixer that mixes the cold water stream and the hot water stream to provide a blended water stream to the basin 102. In an example, the water mixer 314 can include a temperature sensor for safety to prevent potential burn conditions from happening by ensuring a water temperature that is not too high, such as less than about 85 degrees F., which can be adjusted. The water mixer 314 with a temperature sensor can provide a signal to the controller 200 to close the hot water valve or both the cold water valve and hot water valve when a temperature reading that exceeds a set temperature is detected, such as 88 degrees F. In some examples, the water mixer 314 can be manually adjustable to alter the ratio of cold to hot water from the cold and hot water sources. The water mixer 314 can be electronically controlled through the controller 200 or the water mixer 314 can emit signal to the controller, such as emit a signal upon reading a certain temperature.

Alternatively, a regulated temperature water source can be used, wherein the water is sourced at a desired temperature. For example, hot and cold water can be blended in a blending tank or housing and blended to a desired temperature, or a desired range. The blended water at the desired temperature can then be used to fill the basin 102. In such a scenario, only one water valve will be needed to control the flow of water from the blending tank for supplying the basin 102. As the water would be provided to the basin at the desired temperature, the water valve can provide the water to the water supply outlet without passing through or a requirement for a water mixer. In the blending tank or housing embodiment, one or more temperature sensors can detect the tank water temperature and can signal the controller 200 to open or close the cold water valve 302, the hot water valve 304, or both valves in order to achieve the desired set temperature, or the desired set temperature range. In an example, the controller turns on both the cold and hot water valves 302, 304 at the same time to fill the basin or turns off both the cold and hot water valves 302, 304 at the same time when a determined water height is detected. In yet other examples, one valves can be operated serially. That is, the cold water valve or hot water valve is turned on first then the other one of the cold water valve or hot water valve is turned on. Similarly, the cold water valve or hot water valve is turned off first then the other one of the cold water valve or hot water valve is turned off.

The auto-fill assembly 100 can include a water level sensor 402, as previously noted. The water level sensor 402 can be configured to detect a water level or a range of water level in the basin 102, such as 7.8 inches to 8 inches from the basin bottom, as a non-limiting example. The water level sensor 402 can be connected to the controller 200, such as wired, directly or indirectly, to the controller, to provide a signal to the controller when a water level or a range water level is detected by the water level sensor 402, of water in the basin 102. In an exemplary embodiment, the water level sensor 402 can be a proximity sensor located wholly externally of the basin. For example, the water level sensor 402 can be mounted externally of the interior of the basin, such as to the exterior sidewall portion or exterior surface **102*b* of the basin 102, and no part of the water level sensor 402** projects through the wall of the basin and come in physical contact with the water inside the basin. Exemplary proximity sensor usable with the present disclosure can be, for example, a capacitive sensor or a photoelectric sensor.

In an example, the water level sensor 402 can be programmed to send a first signal when no water is present, such as when the auto-fill system 100 is initiated with the basin 102 empty. This first signal can trigger the controller 200 to turn on the cold and hot water valves 302, 304 to begin flow. The water level sensor 402 can be programmed to emit a second signal when water at a certain height or level is detected in the basin. The second signal can be sent to the controller 200. The controller 200 can then activate one or both water valves 302, 304 to shut off water to the water supply outlet 318. In some examples, the water level sensor 402 is programmed to detect the presence of water only, but not the absence of water. That is, upon initiating the auto-fill system 100, the controller is programmed to initiate auto-filling, by turning the cold and hot water solenoid valves on, without first waiting for a signal from the water level sensor 402.

The auto-fill system 100 can be configured such that when the water level sensor 402, such as a when a capacitive proximity sensor, detects water in the basin, at a certain height, level, or to within a targeted water range, the water level sensor 402 outputs a signal to the controller 200. The controller 200 can then send a signal to each of the cold water valve 302 and the hot water valve 304 to stop the flow of water from the sources, thereby stopping flow of water to the basin 102. In some examples, the water level sensor 402 can detect water at a certain height, level or to within a range of water within the basin, then sends a signal to the controller 200, the signal being indicative of the detected water level, the controller the sends a signal to the two valves 302, 304 to module the two valve, then starts a timer to turn the two valves off completely after a set time, such as after 10 seconds, 20 seconds, etc.

In an example, a sensor mount is provided on or at the exterior of the basin. The sensor mount is arranged on the exterior of the basin to ensure reading by the water level sensor 402 of the water level. For example, the sensor mount can include detents, brackets, tabs, mounting screws, etc. for receiving a water level sensor 402. Upon mounting the water level sensor 402 to the sensor mount, the water level sensor 402 is arranged to emit or train its sensor to a desired location and height within the basin. This helps to ensure a water level reading by the water level sensor 402 that is consistent, correct, and repeatable.

In embodiments where the proximity sensor of the water level sensor 402 is of a large enough size, to detect a discrete range of water level, or the water level sensor 402 comprises a plurality of proximity sensors, the water level sensor 402 can send a varying signal output to the controller 200 to indicate different levels of the water in the basin 102. For example, the single capacitive proximity sensor or photoelectric sensor, can be incorporated to detect water at a first level, at a second level that is higher than the first level, etc. By detecting a range or different water levels, such as 7.7 inches to a maximum of 8.0 inches, the controller 200 can be programmed to perform different functions. For example, the controller 200 can start a timer upon receiving the first water level reading from the water level sensor 402 to stop the flow of water after a short time duration versus stopping the water flow immediately upon the first detection by the water level sensor 402. Alternatively, the controller 200 can be programmed to turn on a light or sound an audible signal to indicate that the first level has been detected and then turn off the water flow only after the second water level has been detected.

Thus, the controller 200 can be programmed to activate or perform one or more functions upon receiving a signal from the water level sensor 402. For example, the controller 200 can react after receiving a signal from the water level sensor 402 regarding the first level, and can react again after receiving a second signal from the water level sensor 402 regarding the second level, and so forth. The controller can react by sending a signal to emit an audible sound or turn on a light to notify the technician of the detection, or can activate one or both valves 302, 304.

Figure 4:
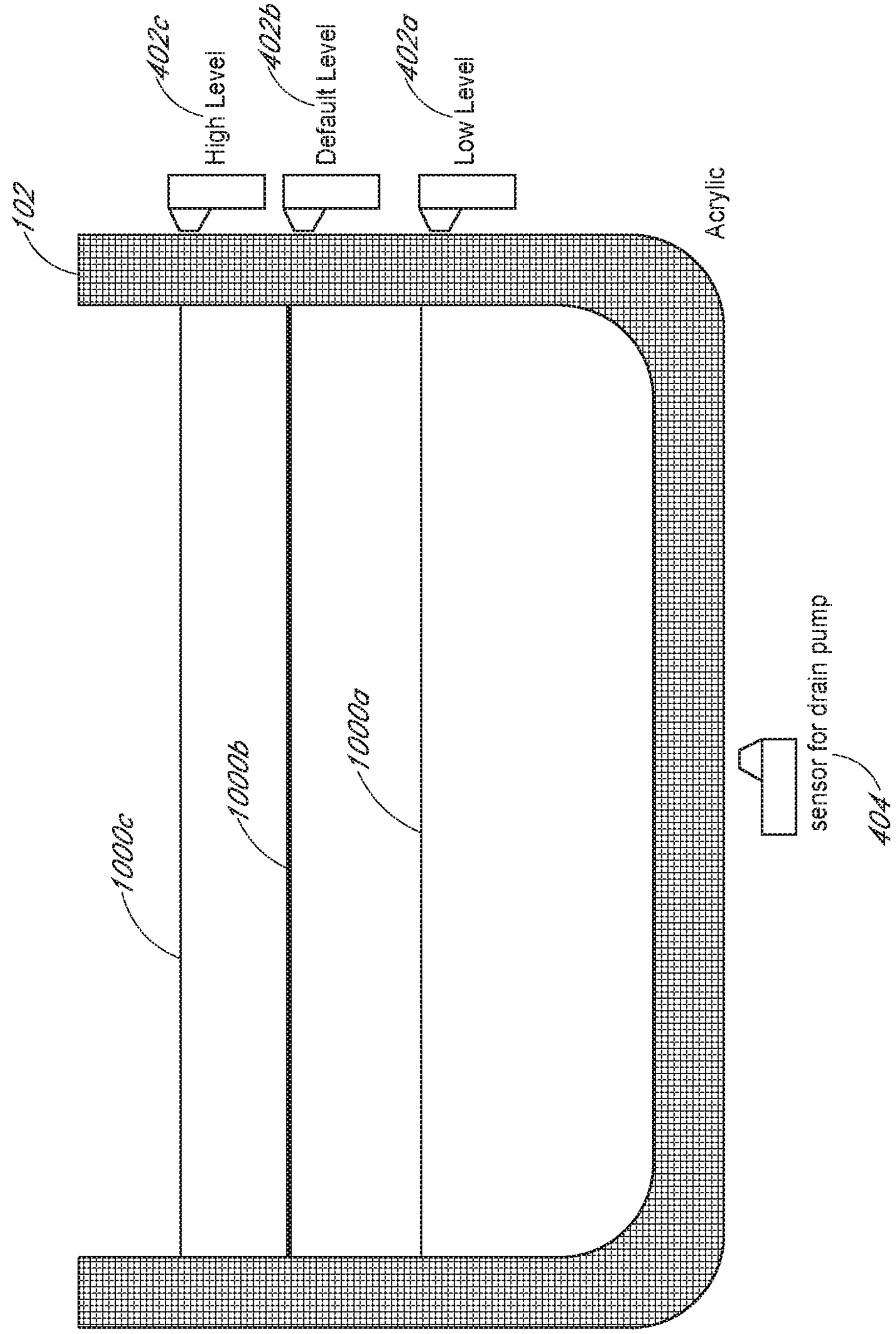
FIG. 4 shows an exemplary embodiment where the water level sensor comprises three separate sensors.

FIG. 4, as further described below, illustrates an exemplary embodiment of a water level sensor 402 having multiple individual proximity sensors. The multiple individual proximity sensors can detect multiple water levels or water level ranges. Detection of multiple water levels can provide the technician with options for controlling how high to fill the basin, such as to account for different feet sizes or when performing different treatments that require more or less water. In embodiments of a single proximity sensor where the sensor can generate a varying signal corresponding to partial to full coverage of the sensor due to increasing the water level in the basin 102, the varying signal can also be used by the controller 200 to correspond to the different water levels.

Alternative types of non-contact sensors can also be used for the water level sensor 402. The criteria for selection the type of level sensors to use would be the type that does not need to physically contact the water in the basin, and therefore the placement of the disposable liner 104 in the basin 102 does not require fitment around such a sensor.

Figure 1A:
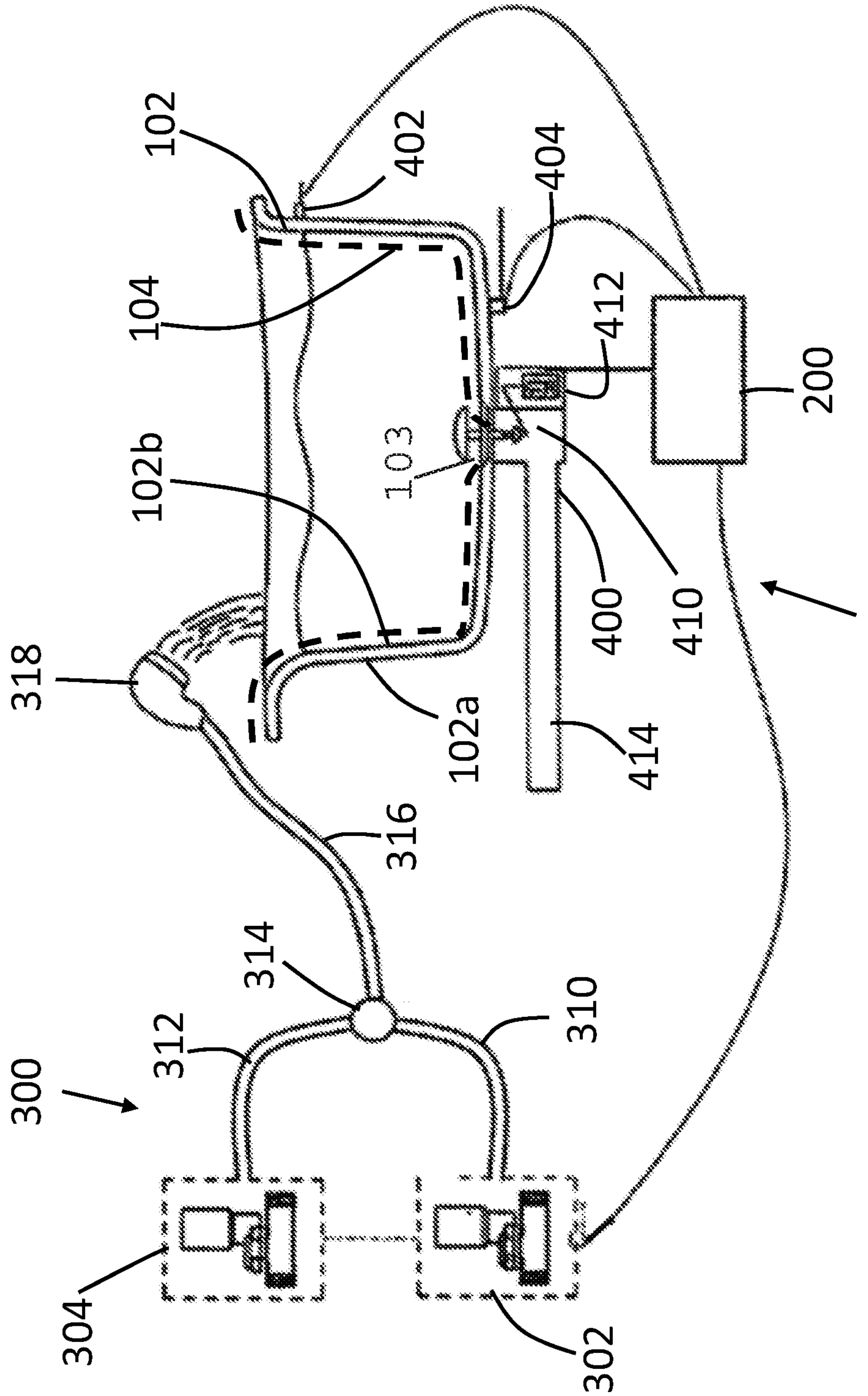
FIG. 1A shows a schematic diagram of the auto-fill system for a pedicure basin according to one embodiment of the present disclosure.

Although the exemplary embodiment of FIG. 1A shows physical lines connecting the various electronic components of the auto-fill system 100, the connections for signals between the components could also be done by means of a wireless connection, such as Wi-Fi®, Bluetooth®, or wireless connection standards or protocols.

Although the auto-fill system 100 is beneficial for usage with a disposable liner 104, the auto-fill system can be used without the disposable liner 104. The detection of the water level for automated shut off to prevent spillover of water from the basin is a benefit to the operation of a pedicure chair with basin independent of usage of disposable liners 104. Among other things, it allows a single technician to operate multiple pedicure chairs or perform other tasks, such as prepping or cleaning, without having to remain at a specific chair to ensure that the basin does not overflow and spillover from manual filling without the disclosed auto-fill system 100.

Alternatively, the basin 102 for application of the auto-fill system 100 is not limited to pedicure chairs but can be applied to other structures having a reservoir, such as a full bath tub or a walk-in bath tub. In embodiments with a bath tub, the water level sensor 402 can comprise a plurality of individual sensors. For example, an embodiment may include at least three water level sensors. A first water level sensor may be positioned to sense when the water is at approximately knee level. A second water level sensor may be positioned to sense when the water is at approximately waist level. A third water level sensor may be positioned to sense when the water is at approximately shoulder level. Variations and embodiments with combinations with only two of such water level sensors can also be envisioned, such as only a first water level sensor at knee level and a second water level sensor at waist level. Alternatively, additional water level sensors at intermediary water levels can also be added.

Figure 2:
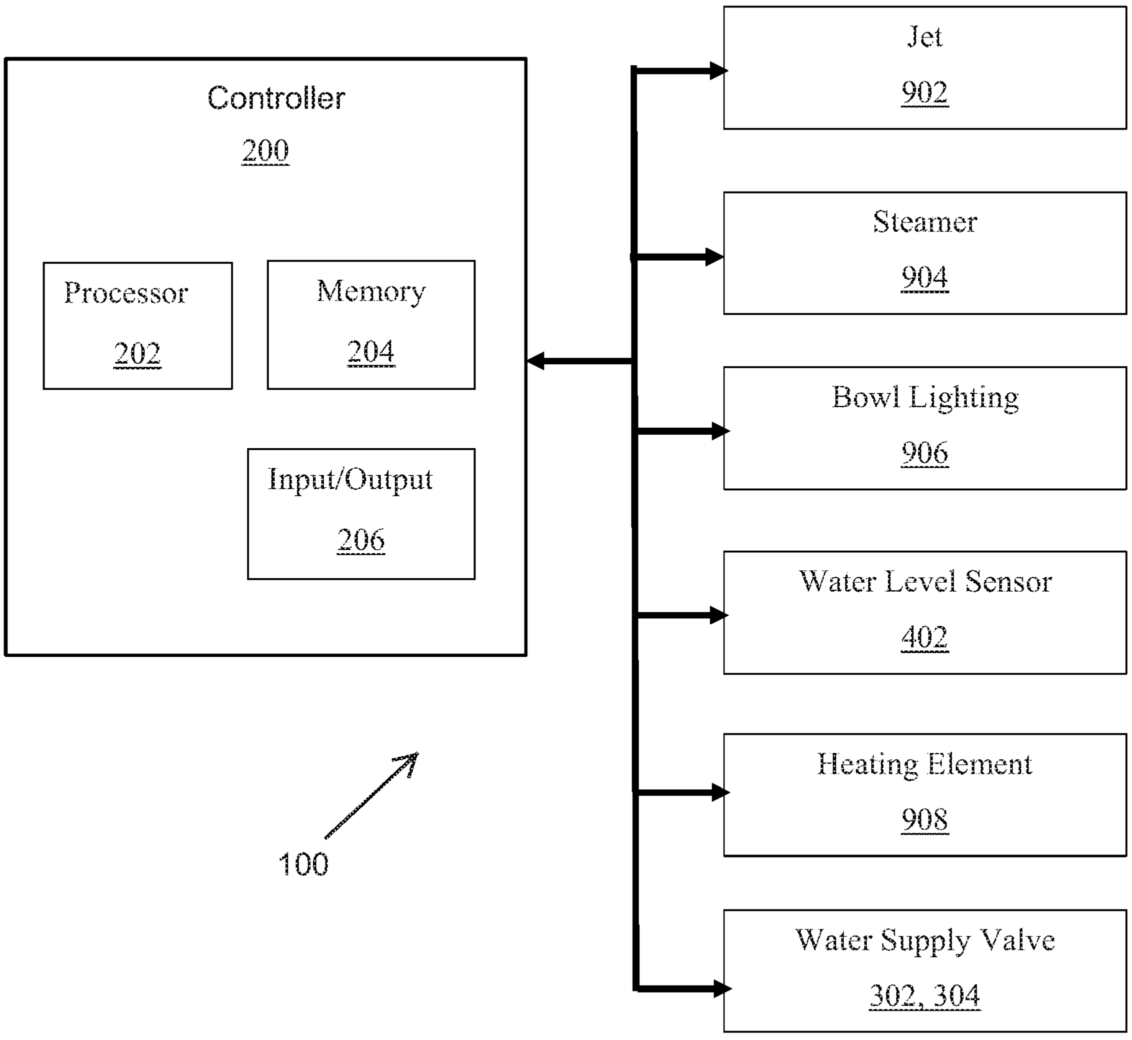
FIG. 2 show a schematic drawing of the electronic components for the auto-fill system according to an embodiment of the present disclosure.

FIG. 2 is a schematic diagram of electronic components for an auto-fill system 100 according to an embodiment of the present invention. The electronic components for the auto-fill system 100 can include a controller 200, at least one proximity sensor 402, and at least one solenoid or valve 302, 304 for the water supply. Additional electronic components that can be connected to the controller 200 include additional features of the basin 102, such as a jet 902, or a pipeless pump as described in reissue U.S. Pat. No. Re46,655, previously incorporated by reference, a steamer 904, basin lighting 906, and a heating element 908. However, if a steamer is used, to generate steam to then blend the steam with the water in the basin, then a heating element 908 can be omitted. When incorporated, the heating element 908 can be of the type disclosed in PCT Publication No. WO 2018/129542 A1, titled Heating Device and System for a Water Basin, the contents of which are expressly incorporated herein by reference. The controller 200 can activate or deactivate each or any one of the additional features, either individually, serially, or singularly, of the jet 902, the steamer 904, the basin lighting 906, and the heating element 908 in relation to activation or deactivation of electronic components of the auto-fill system 100.

In an example, after the controller 200 sends a signal to each of the cold water valve 302 and the hot water valve 304 to stop the flow of water to the basin 102 when the water level has reached a sufficient or desired level, the controller 200 can activate the jet 902, the steamer 904, the basin lighting 906, the heating element 908, or combinations thereof to provide the user with an enjoyable footbath experience.

The controller 200 can include a control board with a processor 202, a computer readable storage medium 204 for storing program code, and an input/output interface 206. The program code can include instructions that when executed by the processor can lead to the components of the auto-fill system 100 performing their functions as described in this disclosure. The input/output interface 206 of the controller 200 can be used to communicate with the connected electronic components.

The controller 200 can have one-way or two-way communication with the connected electronic components as desired. One-way communication lets the controller 200 either send or receive signal to a connected device. With two-way communication, information about the current position or state of an electronic component can be received by the controller 200. In this way, fault checking can be done by the control board for diagnostics of errors in the electronic components.

Accordingly, combinations of features of the auto-fill system 100 with the basin 102 can provide for a variety benefits. By having the controller 200 shut off the supply of water to the basin 102 when the water level sensor 402 detects sufficient water in the basin, water can be conserved automatically without concern of filling the basin 102 with unnecessary water or actually overfilling the basin 102 to the point of spilling of water, which can create a mess and an unwanted situation in a spa or salon environment. Furthermore, by auto-filling the basin and with provisions for preventing overfilling of the basin 102 when the water level sensor 402 detects water at a desired volume or water level, the auto-fill system 100 can prevent water damage to the surrounding areas around the basin 102. Additionally, by preventing overfilling, the auto-fill system 100 can prevent dangerous conditions for persons moving near the basin 102 that may result in slip and falls. By having the failsafe prevention of overfilling, the auto-fill system 100 can also prevent anxiety by property owners, basin operators, and customers alike. The operator can walk away without continuously monitoring the basin filling and not worry about water spilling over out of the basin 102. This is especially useful in the salon business as many operators multitask to ensure smooth operation of the business while attending to customer needs. Customers can appreciate a great experience without unnecessary fuss.

Embodiments of the auto-fill system 100 can also reduce downtime between customers. By removing the time necessary to fit a liner around an electromechanical sensor inside the basin, the operator can more quickly change the liner in the basin 102 without concern of hampering any component or device that may otherwise be used for overflow prevention, especially of the type that requires direct contact with the water. Additionally, the controller 200 of the auto-fill system 100 in accordance with aspects of the invention can further prepare the basin for use by a customer by automatically activating one or more features of the pedicure chair for the customer, such as a jet 902 for pushing and swirling water within the basin, a steamer 904 for maintaining heat to the water inside the basin, basin lighting 906 for aesthetic or ambiance control, or a heating element 908 for maintaining heat to the water inside the basin. By automatically activating these features, the operator does not have to continually monitor and go back and forth between multiple basins 102. In this way, the basins 102 of multiple pedicure chairs can be more quickly prepared for the next customer, freeing the operator to perform other tasks to improve overall efficiency.

Figure 3:
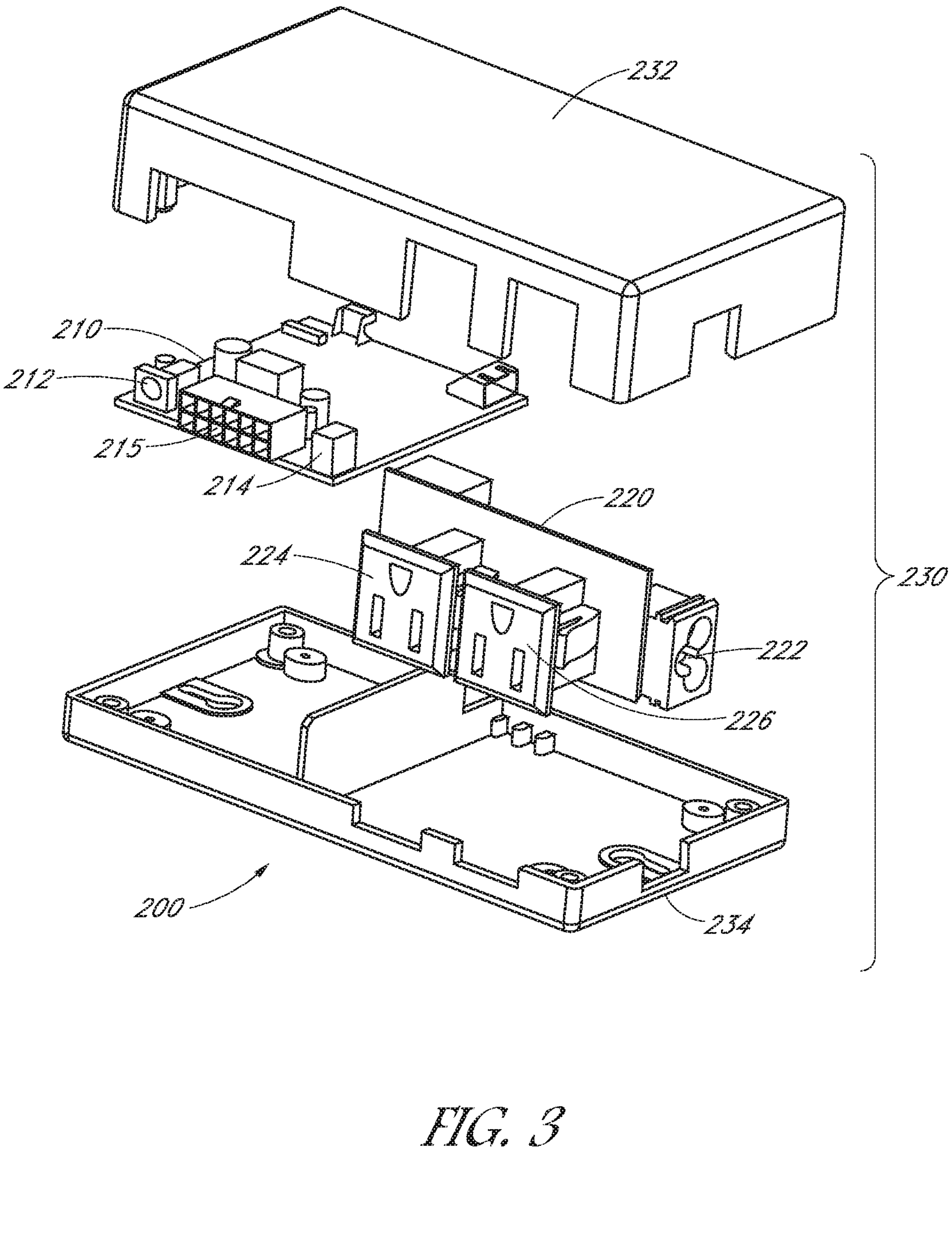
FIG. 3 shows an exemplary embodiment of a control board of the auto-fill system.

FIG. 3 illustrates an exemplary embodiment of a controller 200 of the auto-fill system 100 in accordance with aspects of the invention. In an example, the controller 200 can comprise a main board 210, a connector assembly 220, and a housing 230. The main board 210 can comprise circuitry including a processor and computer readable storage medium, which can comprise a non-transitory computer readable media, power connector 212, and an input/output connector 214.

The power connector 212 can be a connector for powering the controller, such as powering the main board 210. The power connector can be a 24-volt direct current (vdc) barrel connector. Alternatively, a cable or different connector type can also be used. The connector can alternatively be powered using a different DC voltage.

The input/output connector 214 can be used to connect with and communicate with the other electronic components. The input/output connector 215 can be an RS232 type connector. Alternatively, a wireless input/output unit can be used. A wireless input/output unit can operate by means of a wireless connection, such as Wi-Fi®, Bluetooth®, or other wireless connection standard.

The connector assembly 220 can have an electrical or signal connection to the main board 210. The connector assembly 220 can include a power connector 222 to provide power to the controller 200. The connector assembly 220 can also include power connectors or signal connectors 224, 226 for connected electronic components. For example, the connector assembly 220 can include a connector 224 for the jet 902 or a connector 226 for a drain pump or drain valve to drain water from the basin.

The housing 230 can comprise a first housing case or section 232 and a second housing case or section 234 that can enclose the main board 210, the connector assembly 220 and optionally other components therein. The housing 230 can have two or more housing sections so that part of the housing can be opened for servicing or repair of the main board 210, the connector assembly 220, or other components of the controller.

FIG. 4 illustrates an exemplary embodiment where the water level sensor 402 comprises three separate or individual sensors. In the exemplary embodiment shown, the basin 102 has three water level sensors 402*a*, 402*b*, 402*c* mounted to the exterior of the basin to read different water heights or water levels and a drain sensor 404 mounted to the basin 102. The three water level sensors 402*a*, 402*b*, 402*c* can each respectively correspond to detection of a low water level 1000*a*, a default water level 1000*b*, and a high water level 1000*c* inside the basin. The low water level 1000*a*, the default water level 1000*b*, and the high water level 1000*c* can correspond to different water levels in a pedicure basin or to other structures with a reservoir.

Embodiments for application of the three water level sensors 402*a*, 402*b*, 402*c* can allow for adjustable setting of when the controller 200 shuts off the water supply by way of the cold water and hot water valves 302, 304. For reasons such as different physical sizes of customers or personal preferences of the customers or the operators, one of the three water level sensors 402*a*, 402*b*, 402*c* can be selected as the trigger for shutting off the water supply to the basin. The auto-fill system 100 may have a default mode upon initialization to shut off the water supply to the basin when the default water level 1000*b* triggers the default water level sensor 402*b*.

In some embodiments, the usage of three water level sensors can also be used as a failsafe for a scenario where the default level sensor fails. If the default water level sensor 402*b* does not trigger, but the high water level sensor 402*c* does trigger, a water supply shut off can be performed by the controller 200. Additionally, with a three water level sensor configuration, a state for both the low water level sensor 402*a* and the high water level sensor 402*c* being triggered without the default water level sensor 402*b* being triggered can be a scenario for shutting off the water supply. An embodiment utilizing both the low water level sensor 402*a* and the high water level sensor 402*c* could also prevent a false trigger if the water supply from the water supply outlet 318 were accidentally directed at or splashing the high water level sensor 402*c* during filling. In other examples, only two individual sensors are incorporated, such as the low or default level sensor as one sensor and a high level sensor as the second sensor. In still other examples, a single proximity sensor with a range of detection can be used to detect different water levels.

Figure 5:
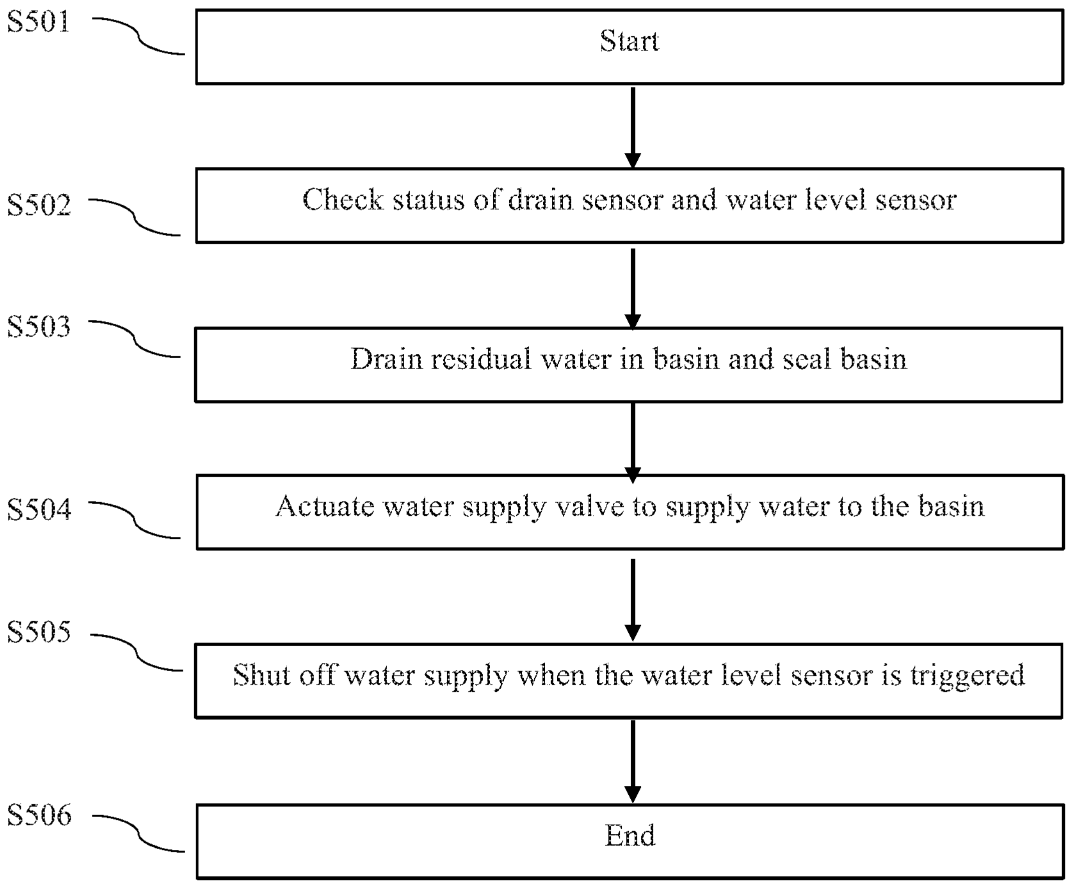
FIG. 5 shows a flowchart for a control logic process operation of an embodiment of the auto-fill system.
Figure 6:
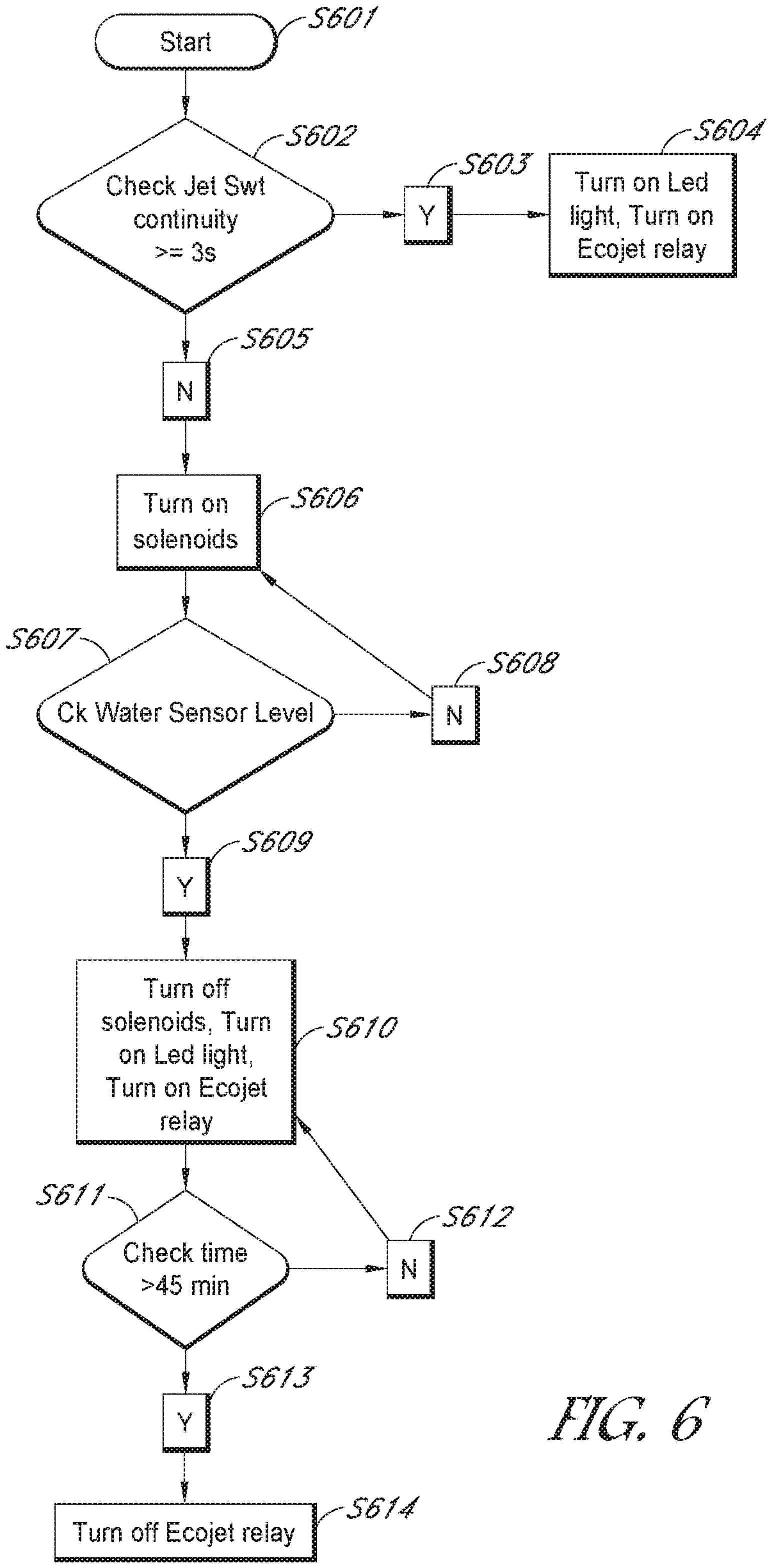
FIG. 6 shows a flowchart of a control logic process operation of an embodiment of the auto-fill system.

FIG. 5 illustrates a flowchart depicting the control logic process or operation 500 of the auto-fill system 100 in accordance with aspects of the invention. The flowchart illustrates a basic operation of the auto-fill system 100 in relation to the filling process of the basin 102 with water. FIG. 6 illustrates an embodiment where additional electronic components associated with a basin having an auto-fill system 100 in accordance with aspects of the invention. The additional electronic components can include a jet, lights, and a steamer.

With reference initially to FIG. 5 and FIG. 1A, initialization or turning on of the auto-fill system 100 can occur at step S501. The auto-fill system 100 can perform diagnostic checks of its components during initialization. At step S502, the auto-fill system 100 can check the status of the drain sensor 404 to detect if there is water in the basin, which can be identified or set as old water. In step S503, if there is still old water, the auto-fill system can actuate the drain actuator 412 to open the basin drain mechanism 410 to drain the old water and then close the basin drain mechanism 410 to close the drain opening of the basin 102. At step S504, the auto-fill system 100 can activate the cold water valve 302 and the hot water valve 304 to allow the flow of water from the water sources to the basin. At step, S505, when the water level sensor 402 is triggered by a sufficient water level in the basin 102, the auto-fill system 100 can shut off the flow of water to the basin 102 by triggering the solenoids of the cold water valve 302 and the hot water valve 304. This can end the basin water fill operation of the auto-fill system 100 at step S506.

FIG. 6 illustrates a flowchart depicting the control logic process or operation 600 of an embodiment of the auto-fill system 100 with additional basin components.

In FIG. 6, initialization or turning on of the auto-fill system 100 can occur at step S601. At step S601, the auto-fill system 100 can check for a jet switch signal and determine if there is continuity for three or more seconds, or as programmed. This system check can be used to determine if water is present in the basin, by checking to see if one of the sensors senses the present of water in the basin. If it is determined that the jet switch has continuity, or is actuated, for three seconds or more at step S603, then the auto-fill system 100 turns on the basin lighting 906 and the jet 902 at step S604. If it is determined that the jet switch does not have continuity for at least three seconds at step S605, which can be interpreted as an empty basin 102, then the auto-fill system 100 turns on the cold water valve 302 and the hot water valve 304 to supply water to the basin 102 at step S606. At step S607, the auto-fill system 100 can check whether the water level sensor 402 indicates that the water level in the basin has reached a predetermined level. If the water level has not reached the predetermined level at step S608, then the auto-fill system 100 continues to have the cold water valve 302 and the hot water valve 304 supply water to the basin 102.

If the water level reaches the predetermined level at step S609 to trigger the water level sensor 402, then the auto-fill system 100 shuts off the cold water valve 302 and the hot water valve 304 to stop supplying water to the basin 102 at step S610. Additionally, at step S610 the auto-fill system 100 can turn on the basin lighting 906 and the jet 902. The jet 902 should ideally only be turned on after the water has reached the predetermined level.

At step S610, the auto-fill system 100 can turn on the basin lighting 906 and the jet 902 after a time delay from shutting off the cold water valve 302 and the hot water valve 304, such as three seconds. At step S611, the auto-fill system 100 can check the time since or from after the jet 902 has activated. This step can be viewed as the jet 902 run time check and can be adjusted to control how long the jet should run, such as to control treatment time. If the time that the jet 902 has activated is less than a predetermined time, such as 45 minutes, then the auto-fill system 100 can allow the jet 902 to continue to operate at step S612. If the time since the jet 902 has activated is equal to or more than a predetermined time, such as 45 minutes at step S613, then the auto-fill system 100 can turn off the jet 902 at step S614, such as by shutting off power to the jet 902.

Figure 6A:
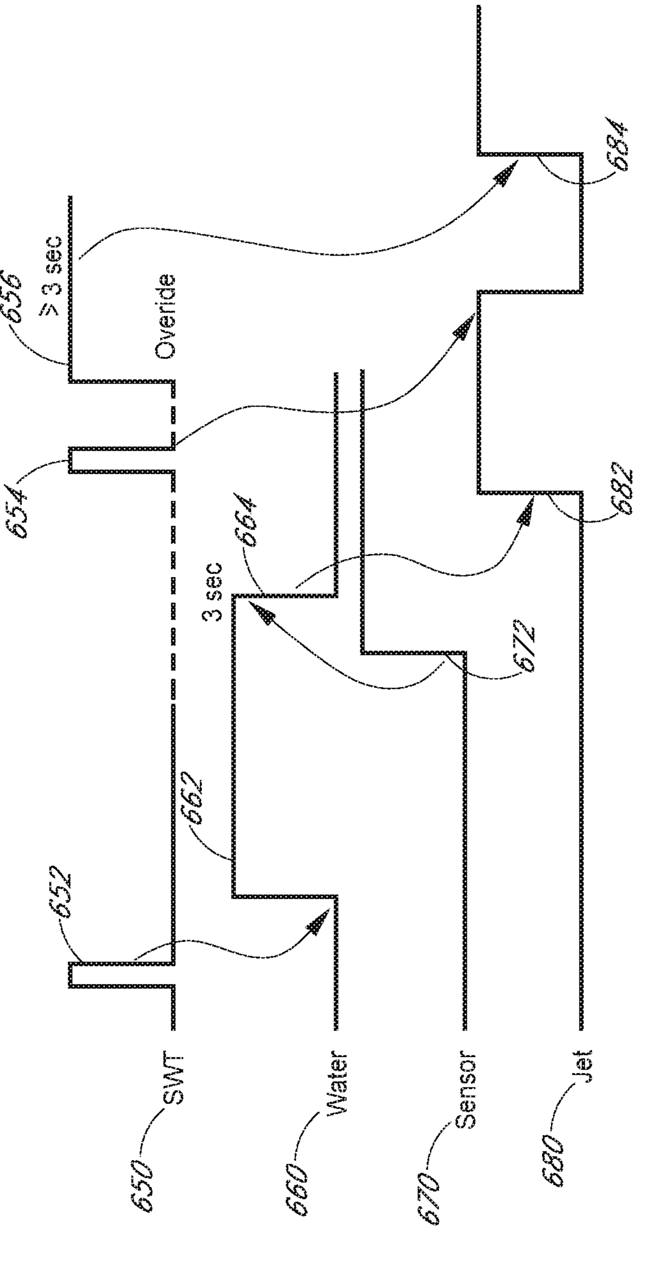
FIG. 6A shows an exemplary chart of signal changes signifying activation of the auto-fill system and other electronic components of the basin.

FIG. 6A illustrates an exemplary chart of signal changes signifying activation of the auto-fill system 100 and other electronic components of the basin 102. The chart illustrates signals for the jet switch 650, at least one water valve 660, the water level sensor 660, and the jet 680. In operation, the auto-fill system 100 can check for continuity of three seconds or more of the jet switch 650. When the signal for continuity is less than three seconds 652, then the at least one water valve can be activated 662 to allow for the supply of water to the basin 102, or to activate two solenoid valves to activate both the hot water flow and the cold water flow. When the water level sensor detects the water level in the basin to be at a predetermined water level, or to within some acceptable tolerance, then it can generate a signal 672 indicating this state. The at least one water valve can be shut off. There can be a time delay from receiving the signal until shut off, such as three seconds 664 after receiving the signal indicating the predetermined water level.

After the at least one water valve is shut off, thereby shutting off the supply of water to the basin 102, the jet can be activated 682. If the jet switch is actuated for less than three seconds 654 when the jet is activated 682, the jet can be deactivated. Alternatively, the actuation for less than three seconds may have no effect on the activated jet. If the jet switch is actuated for three seconds or more 656, the jet may be activated via override 684 and continue operating beyond its default programmed time.

Figure 7:
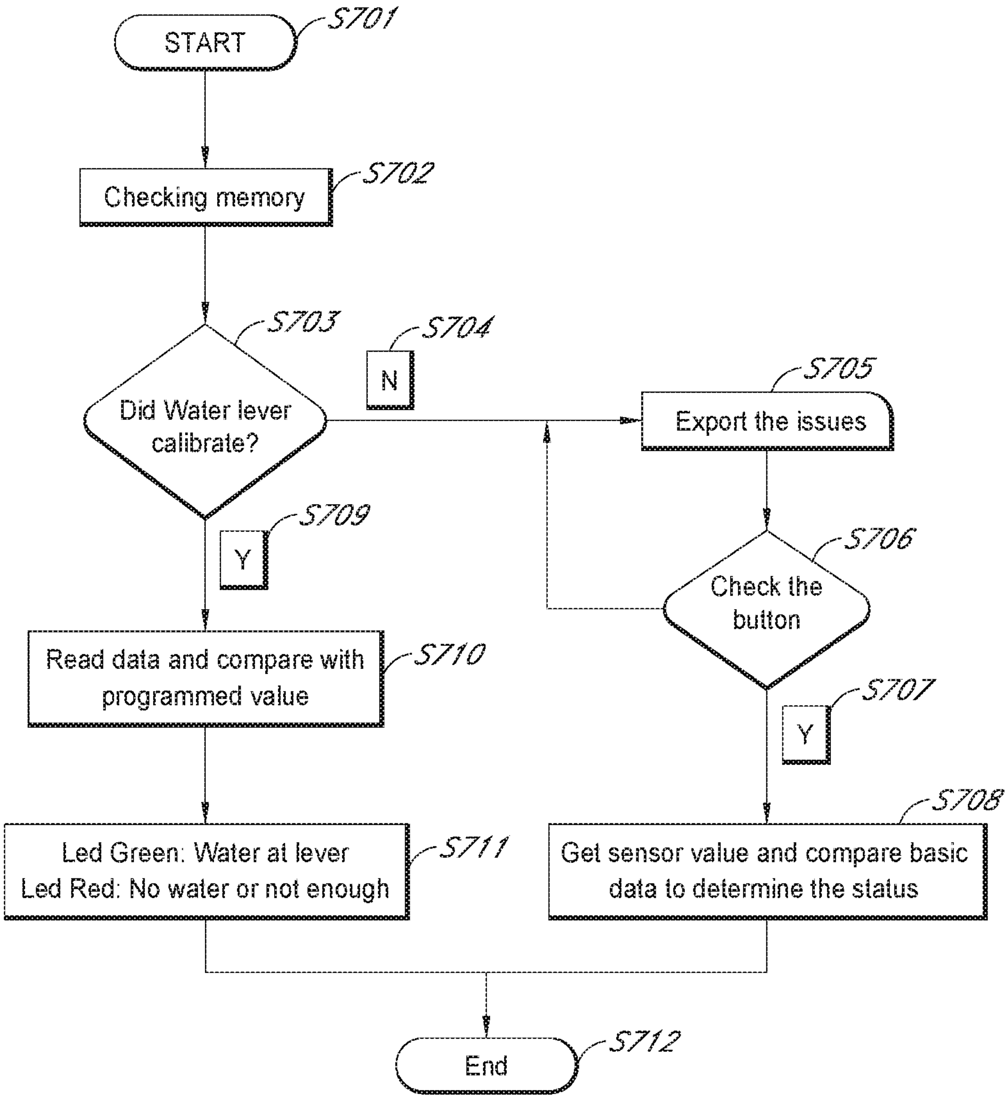
FIG. 7 shows a flowchart of a control logic process operation for initialization of the water level sensor.

FIG. 7 illustrates a flowchart depicting the control logic process or operation 700 for initialization of the water level sensor 402. The initialization of the water level sensor 402 starts at step S701 and includes a memory check at step S702 for a prestored initialization signal value for the water level sensor 402. The memory can store a prestored initialization signal value that should match the signal value for the water level sensor 402 before filling the basin with water. At step S703, the auto-fill system 100 can compare the prestored initialization signal value from the memory with the signal value from the water level sensor 402 to see if the water level sensor is calibrated if the signal values match.

If the water level sensor 402 is not calibrated at step S704, then the auto-fill system 100 exports the issue at step S705. The auto-fill system 100 can export the issue to the memory for access by the operator. Alternatively, the auto-fill system 100 can export the issue through another option, such as an attached display or by flashing of an attached lighting, which can be an LED light capable of emitting different colors to designate different states or codes. Following the exporting of issue(s), a verification or reset button can be manipulated by the operator at step S706. If the auto-fill system 100 does not detect manipulation of the button by the operator, then it will stay in the export of issues until the operator checks the issues. If the operator has manipulated the button, then the auto-fill system can attempt to determine the status of the water level sensor 402 at step S708 by comparing the prestored initialization signal value from the memory with the signal value from the water level sensor 402. For example, if there is a lack of signal, this may indicate a faulty water level sensor 402 or a faulty signal connection. If there is a different signal, it may indicate a dirty basin or water level sensor needing cleaning. Alternatively, if the signal value of a replacement sensor is different, it may warn the operator that further calibration may be needed to account for the replacement sensor having different characteristics from the previous water level sensor.

If the water level sensor is calibrated at step S709, then the auto-fill system 100 can compare signal values from the water level sensor 402 to a prestored water level signal value corresponding to a predetermined water level at step S710. At step S711, the auto-fill system 100 can illuminate a light to indicate that the water level in the basin 102 is at the predetermined water level. For example, in an embodiment, the auto-fill system 100 can illuminate a green light, such as a light emitting diode (LED), if the water level is at the predetermined water level, or illuminate a red light if the water level is below the predetermined water level or there is no water. After step S708 or S711, the water level sensor 402 can be ready for operation by ending initializing at step S712.

In addition to a pedicure chair with a basin having an auto-fill system and components thereof, including added controllable components such as a jet, lights, a heater, etc.

the present invention is understood to include methods of using and of making such apparatuses and components.

Although limited embodiments have been specifically described and illustrated herein, many modifications and variations will be apparent to those skilled in the art. Accordingly, it is to be understood that the apparatus constructed according to principles of the disclosed device, system, and method may be embodied other than as specifically described herein. The disclosure is also defined in the following claims.

What is claimed is:

1. A pedicure chair assembly with an auto-fill system for repeated spa treatment use sessions, comprising:

a seat having a seating surface;

a basin located, elevation-wise, below the seat, said basin having walls having an exterior surface, an interior surface defining a basin interior, a basin sidewall, and a basin bottom wall having a drain opening;

an electronically controllable valve configured to control flow of water into the basin;

a first level sensor mounted externally of the basin and configured to detect a first water level of the basin when water is filled in to the basin;

a drain actuator mounted externally of the basin and configured to open and close the drain opening from fluid flow;

a drain sensor mounted externally of the basin and below, elevation-wise, the water level sensor, said drain sensor configured to detect whether water is present in the basin interior; and a controller programmed to receive a first level indication signal from the first level sensor corresponding to the detected first water level and send a first command signal to the electronically controllable valve to open the electronically controllable valve for fluid flow through the electronically controllable valve or to close the electronically controllable valve to block fluid flow through the electronically controllable valve as a function of the first level indication signal;

wherein the controller is programmed to receive a water detection signal from the drain sensor when water is present in the basin interior and is programmed to send a second command signal to the drain actuator to open or close the drain opening.

2. The pedicure chair assembly of claim 1, wherein the electronically controllable valve comprises a solenoid valve.

3. The pedicure chair assembly of claim 1, wherein the controller is programmed to receive the water detection signal from the drain sensor when water is present in the basin interior prior to a new spa treatment use session and prior to sending the first command signal to the electronically controllable valve.

4. The pedicure chair assembly of claim 1, further comprising a second level sensor mounted wholly externally of the basin interior and configured to detect a second water level of the basin.

5. The pedicure chair assembly of claim 4, wherein the second level sensor is mounted higher, elevation-wise, than the first level sensor;

wherein the detected second water level of the basin corresponds to a higher water level of the basin than the detected first water level of the basin; and wherein the controller is configured to receive a second level indication signal from the second level sensor corresponding to the second water level and send a third command signal to the electronically controllable valve to open the electronically controllable valve for fluid flow through the electronically controllable valve or to close the electronically controllable valve to block fluid flow through the electronically controllable valve as a function of the second level indication signal.

6. The pedicure chair assembly of claim 1, wherein the first level sensor comprises a capacitive proximity sensor.

7. The pedicure chair assembly of claim 6, wherein the controller compares the first signal from the first level sensor to a prestored value to determine whether the detected first water level has reached at least a first predetermined water level.

8. The pedicure chair assembly of claim 6, wherein the basin comprises a resin material.

9. The pedicure chair assembly of claim 6, wherein the controller is further configured to activate a basin electronic component after shutting off the flow of water into the basin.

10. The pedicure chair assembly of claim 9, wherein the basin electronic component comprises at least one of a water jet, a heating element, a steamer, a light, or a water circulation pump.

11. A method of using a pedicure chair assembly configured for repeated spa treatment use sessions, the method comprising:

electronically wiring an electronically controllable valve to a controller, the electronically controllable valve controllable by the controller to control flow of water into a basin, the basin located, elevation-wise, below a seat and the basin having an exterior surface, an interior surface defining a basin interior, a basin sidewall, and a basin bottom wall having a drain opening;

attaching a first level sensor to the pedicure chair at a location externally of the basin interior, the first level sensor is configured to detect a first predetermined water level inside the basin interior;

attaching a drain sensor externally of the basin interior at a location below, elevation-wise, the first level sensor, to detect whether water is present in the basin interior;

electronically connecting the first level sensor to the controller, the controller being configured to receive a first signal from the first level sensor corresponding to the first predetermined water level and send a first command signal to the electronically controllable valve to actuate the electronically controllable valve; and electronically connecting the drain sensor to the controller, wherein the controller is configured to receive a water detection signal from the drain sensor when water is present in the basin and is configured to send a second command signal to a drain actuator to open or close the drain opening.

12. The method of claim 11, wherein the electronically controllable valve comprises a solenoid valve.

13. The method of claim 11, further comprising sending a second command signal to a drain actuator to open or close the drain opening prior to a new spa treatment use session and prior to sending the first command signal to the electronically controllable valve.

14. The method of claim 11, further comprising attaching a second level sensor externally of the basin and configuring the second level sensor to detect a second predetermined water level.

15. The method of claim 14, wherein attaching the second level sensor comprises attaching the second sensor nearer a top of the basin than the first level sensor;

wherein the second predetermined water level corresponds to a higher water level than the first predetermined water level; and wherein the controller is configured to receive a second signal from the second level sensor corresponding to the second predetermined water level and transmit a failsafe signal to actuate the electronically controllable valve as a failsafe even if the controller fails to receive the first signal from the first sensor.

16. The method of claim 11, further comprising receiving a water detection signal from the drain sensor when water is present in the basin prior to a new spa treatment use session and prior to sending the first command signal to the electronically controllable valve.

17. The pedicure chair assembly of claim 16, wherein the controller is programmed to send the second command signal to the drain actuator to open or close the drain opening prior to a new spa treatment use session and prior to sending the first command signal to the electronically controllable valve.

18. The method of claim 11, further comprising using the controller to transmit the first command signal to close the electronically controllable valve to shut off the flow of water into the basin in response to receipt of the first signal from the first sensor.

19. The method of claim 18, wherein the controller compares the first signal from the first sensor to a prestored value to determine the first predetermined water level.

20. The method of claim 18, further comprising configuring the controller to activate a basin electronic component after shutting off the flow of water into the basin.

21. The method of claim 20, wherein the basin electronic component comprises at least one of a water jet, a heating element, a steamer, a light, or a water circulation pump.

* * * * *